(12) United States Patent
Bauerdick et al.

(10) Patent No.: US 9,933,051 B2
(45) Date of Patent: Apr. 3, 2018

(54) TENSIONING DEVICE

(71) Applicant: Muhr und Bender KG, Attendorn (DE)

(72) Inventors: Thomas Bauerdick, Sundern (DE); Joachim Jud, Daaden (DE); Michael Schulte, Drolshagen (DE); Kai Nowadnick, Overath (DE)

(*) Notice: Subject to any disclaimer, the term of this patent is extended or adjusted under 35 U.S.C. 154(b) by 0 days.

(21) Appl. No.: 15/207,775

(22) Filed: Jul. 12, 2016

(65) Prior Publication Data

US 2017/0023108 A1    Jan. 26, 2017

(30) Foreign Application Priority Data

Jul. 21, 2015  (DE) .................. 10 2015 111 809

(51) Int. Cl.
   *F16H 7/12*  (2006.01)
   *F16H 7/08*  (2006.01)

(52) U.S. Cl.
   CPC ............. *F16H 7/1245* (2013.01); *F16H 7/08* (2013.01); *F16H 7/0831* (2013.01); *F16H 7/0838* (2013.01); *F16H 2007/081* (2013.01); *F16H 2007/0806* (2013.01); *F16H 2007/0844* (2013.01); *F16H 2007/0865* (2013.01); *F16H 2007/0893* (2013.01)

(58) Field of Classification Search
   CPC ............. F16H 2007/081; F16H 7/1218; F16H 2007/0893; F16H 2007/084; F16H 7/1281
   USPC .................................. 474/133, 135
   See application file for complete search history.

(56) References Cited

U.S. PATENT DOCUMENTS

| 4,698,049 A | * | 10/1987 | Bytzek | F16H 7/1218 384/271 |
| 4,971,589 A | * | 11/1990 | Sidwell | F16H 7/1218 474/117 |
| 5,599,245 A | * | 2/1997 | Giese | F16H 7/1218 474/135 |
| 5,772,549 A | * | 6/1998 | Berndt | F16H 7/1281 474/135 |
| 5,795,257 A | * | 8/1998 | Giese | F16H 7/1218 474/109 |

(Continued)

FOREIGN PATENT DOCUMENTS

| DE | 4300178 C1 | 4/1994 |
| DE | 19647225 A1 | 5/1997 |

(Continued)

*Primary Examiner* — Henry Y Liu
(74) *Attorney, Agent, or Firm* — Bejin Bieneman PLC

(57) ABSTRACT

The invention relates to a tensioning device for a traction drive, comprising a receiving housing, a roller carrier which is pivotably connected to the receiving housing, a helical tension spring which is supported at the receiving housing and at the roller carrier in circumferential and axial direction, wherein the roller carrier and the receiving housing are axially fixed relative to one another by the helical tension spring, a bearing arrangement by which the roller carrier is supported in the receiving housing so as to be rotatable around a rotational axis, a damping arrangement for damping a rotational movement of the roller carrier relative to the receiving housing, wherein the damping arrangement is arranged so as to be axially spaced from the bearing arrangement and is axially loaded by a tensile load of the helical tension spring.

16 Claims, 5 Drawing Sheets

(56) References Cited

U.S. PATENT DOCUMENTS

| | | | | |
|---|---|---|---|---|
| 5,803,849 A * | 9/1998 | Ayukawa | ............... | F16H 7/1218 474/135 |
| 5,967,919 A * | 10/1999 | Bakker | ................ | F16H 7/1218 474/115 |
| 6,004,235 A * | 12/1999 | Ohta | ..................... | F16H 7/1218 474/109 |
| 6,767,303 B2 * | 7/2004 | Ayukawa | ............... | F16H 7/1218 474/135 |
| 7,448,974 B2 * | 11/2008 | Crist | ..................... | F16H 7/1218 474/133 |
| 7,497,794 B2 * | 3/2009 | Lannutti | ............... | F16H 7/1218 474/133 |
| 7,819,765 B2 * | 10/2010 | Kawahara | ............ | F16H 7/1218 474/135 |
| 7,850,561 B2 * | 12/2010 | Wilhelm | ............... | F16H 7/1218 474/112 |
| 8,100,793 B2 * | 1/2012 | D'Amicantonio et al. | ..................... | F16H 7/1218 474/135 |
| 8,475,308 B2 * | 7/2013 | Crist | ..................... | F16H 7/1218 474/135 |
| 8,617,013 B2 * | 12/2013 | Ferguson | ............. | F16H 7/1218 474/135 |
| 8,702,543 B2 * | 4/2014 | Quintus | ................ | F16H 7/1218 474/135 |
| 8,888,627 B2 * | 11/2014 | Crist | ..................... | F16H 7/1218 474/133 |
| 9,377,090 B2 * | 6/2016 | Ma | ........................ | F16H 7/1218 |
| 9,394,977 B2 * | 7/2016 | Dutil | ..................... | F16H 7/1218 |
| 2004/0235598 A1 * | 11/2004 | Kawasaki | ............. | F16H 7/1218 474/135 |
| 2005/0043130 A1 * | 2/2005 | Hao | ....................... | F16H 7/1218 474/135 |
| 2006/0100050 A1 * | 5/2006 | Crist | ..................... | F16H 7/1218 474/135 |
| 2008/0119311 A1 * | 5/2008 | Wilhelm | ............... | F16H 7/1218 474/135 |
| 2013/0260933 A1 * | 10/2013 | Dutil | ..................... | F16H 7/1218 474/135 |

FOREIGN PATENT DOCUMENTS

| | | |
|---|---|---|
| DE | 19603558 C2 | 3/2000 |
| DE | 102007050204 A1 | 5/2008 |
| EP | 0858563 B1 | 12/1999 |
| EP | 1277989 A2 | 1/2003 |
| EP | 1812731 A2 | 8/2007 |

* cited by examiner

TENSIONING DEVICE

CROSS-REFERENCE TO RELATED APPLICATIONS

This application claims priority to German Application No. DE 10 2015 111 809.2, filed on Jul. 21, 2015, which application is hereby incorporated herein by reference in its entirety.

BACKGROUND

A traction drive usually comprises an endless traction element, such as a belt or chain, and at least two pulleys of which one can function as an input and the other one as an output. Such traction drives can be used for example in connection with internal combustion engines of a motor vehicle for driving auxiliary apparatuses or accessories, wherein a first pulley is positioned on the crankshaft of the internal combustion engine and drives the belt.

Further, belt pulleys are associated with the auxiliary apparatuses, such as a water pump, a generator or an air conditioning compressor, and are rotatingly driven by the traction drive. In conventional traction drives the auxiliary apparatuses are designed as consumers, i.e., they are driven by the pulley of the crankshaft via the belt. A slack side of the belt is formed between the crankshaft and the apparatus adjoining the crankshaft in the direction of the circulation of the belt, said adjoining apparatus typically being a generator. In order to ensure that the traction member is sufficiently wrapped around the drive pulley, the traction member is pretensioned by a tensioning roller of the tensioning device.

From EP 1 277 989 A2 a belt tensioning device is known with a housing and a roller carrier pivotably connected to the housing. The roller carrier is radially and axially supported relative to the housing by means of a bearing and is pretensioned relative thereto by a tension-loaded helical spring. The roller carrier is thus axially fixed to the housing via the bearing and the helical spring. A damping device is provided which dampens relative movements between the roller carrier and the housing in such a way that the damping effect is greater at an increasing tensioning force than at a decreasing tensioning force. The damping device comprises a damping bush and a band spring which, at its first end, is rotationally fixed at the housing or at the roller carrier and, at its second end, it is rotationally fixed at the damping bush.

DE 196 03 558 C2 proposes a belt tensioning device with a receiving housing, with a roller carrier pivotably connected thereto, as well as a bearing and damping device. The bearing and damping device comprises a bearing and damping cone which is pretensioned in respect of tension and torsion by a helical spring.

From EP 0 858 563 B1 a tensioning device is known for a traction element, which tensioning device comprises a housing and a tensioning arm which is rotatably supported relative to the housing by a friction bearing. The friction bearing faces of the friction bearing are provided in the form of conical faces arranged parallel relative to one another and concentrically relative to the tensioning arm axis. A helical rotational spring is supported between a support at the tensioning arm and a support at the housing, wherein in the mounted condition, a torsion pretension and an axial pretension is applied by said spring. Thereby, an axial force of the helical rotational spring is introduced into the friction bearing as a reaction force effective perpendicularly relative to the friction bearing faces, so that the friction bearing faces are pressed against one another under the axial force.

Tensioning devices with cylindrical damping systems are relatively complex and therefore expensive in respect of production and assembly. Tensioning devices with conical damping systems are more susceptible in respect of an undesirable tilt of the tensioning arm relative to the housing.

SUMMARY

The present disclosure relates to a tensioning device for a traction drive, such as a belt or chain drive. Proposed herein is a tensioning device for a traction drive whose design and assembly are simple and cost-effective and ensure a long service life.

A solution includes providing a tensioning device for a traction drive comprising: a receiving housing; a roller carrier which is pivotably connected to the receiving housing; a helical tension spring which is supported against the receiving housing and against the roller carrier, each in circumferential and axial direction, wherein the roller carrier and the receiving housing are axially fixed, i.e., connected to one another by the helical tension spring; a bearing arrangement by which the roller carrier is rotatably supported in the receiving housing around a rotational axis; a damping arrangement for damping a rotational movement of the roller carrier relative to the receiving housing, wherein the damping arrangement is axially spaced relative to the bearing arrangement and is axially loaded by the tensional load of the helical tension spring.

An advantage of the tensioning device is that, because of the axial distance between the bearing arrangement and the damping arrangement, the roller carrier is supported relative to the receiving housing well against any transverse forces. The risk of any undesirable tilting of the roller carrier relative to the receiving housing and thus an increase in wear is minimised. At the same time, the helical spring acts as a tensile spring which axially loads the roller carrier towards the receiving housing. In other words, the roller carrier and the receiving housing are axially pulled towards one another by the helical spring. The helical spring is supported on the receiving housing and on the roller carrier in opposed rotational directions. When the tensioning arm carries out a pivot moment against the circumferentially acting supporting force of the receiving housing, the helical spring is radially expanded, wherein the helical spring, with an increasing radial expansion, is subjected to tensile loads to an increasing extent. Thus, an increasing pivot movement of the roller carrier relative to the receiving housing, leads to an increasing axial force between said components towards one another, so that, due to the increasing axial force, also the friction moment of the damping arrangement and thus the damping effect increase accordingly. The rate of damping is thus functionally dependent on the degree of the pivot movement, which, overall, advantageously affects the damping behaviour.

The tensioning device serves to tension a traction element of a traction drive. The traction element can be a belt for a belt drive, with the tensioning device then being a belt tensioning device. However, it is also conceivable for the traction element to be a chain for a chain drive which is pretensioned by the tensioning device.

It is proposed that the receiving housing can be connected to a stationary component, for example, to an engine block of a motor vehicle or to a component connected thereto. For this purpose, the receiving housing is provided with suitable connecting elements, for example, for a flange and/or bolted connection. The receiving housing can be cup-shaped and comprise a base and a casing portion inside which a receiving chamber is formed for receiving the roller carrier and the helical spring.

The roller carrier is configured to be able to carry a roller for loading the traction element. For this purpose the roller carrier is provided with an arm portion on which the roller is supported so as to be rotatable around a roller axis which extends parallel to the pivot axis. To that extent, the roller carrier can also be referred to as tensioning arm, and the roller can be referred to as a tensioning roller. The roller carrier can be a casting, for example made of a light metal, i.e., aluminium, or out of an aluminium alloy, more particularly made by pressure diecasting. The same applies to the receiving housing.

In one example the bearing arrangement comprises a medium bearing diameter which is smaller than the medium diameter of the damping arrangement, with "medium diameter" in this case meaning the medium diameter between a greatest diameter and a smallest diameter of the respective arrangement.

The bearing arrangement can comprise a bearing bush which is arranged between a bearing part of the receiving housing and a bearing part of the roller carrier. More particularly, the bearing bush is substantially cylindrical, which includes the possibility for the bearing bush to have a slightly conical face of up to 3° relative to the pivot axis. Because of the slightly conical shape, the respective parts can be removed more easily from their moulds when being produced. If the bearing arrangement is slightly conical, it is tapered towards the base of the receiving housing. The bearing part of the receiving housing can be provided in the form of a bearing sleeve, in which case the bearing part of the roller carrier has the shape of a bearing bolt which is inserted into the bearing sleeve of the receiving housing, with the bearing bush being incorporated in between. The bearing bolt can be integrally formed with the hub of the roller carrier or it can be cast thereto. Alternatively, the bearing bolt can be produced as a separate component, with the hub part being pressed or injection moulded. The bearing material for the bearing bush can be suitable plastics for example or steel bushes coated with a friction-reducing material such as PTFE. The bearing bush and the damping bush can consist of different materials, with the damping bush in this case being made of a material with a higher friction coefficient than the bearing bush. In principle, regarding the design of the bearing arrangement, a cinematic reversal is also conversable, i.e., the bearing part of the roller carrier can be provided in the form of a bearing sleeve, in which case the bearing bolt would have to be provided at the base of the receiving housing.

According to an example, it is proposed that a support-free intermediate region is formed axially between the bearing arrangement and the damping arrangement, in which support-free region the receiving housing does not provide any support of the transverse forces introduced via the roller carrier. In other words, the support of the transverse forces introduced by the tensioning roller into the roller carrier is effected entirely by the bearing arrangement and the damping arrangement axially spaced therefrom. In an example, an axial length of the support-free intermediate region is greater than the axial length of the bearing arrangement and/or the axial length of the damping arrangement. In this way, there are provided particularly effective supporting conditions against transverse forces.

More particularly, it is proposed that the damping arrangement comprises at least one pair of friction faces which is axially loaded by a tensile force of the helical tensile spring.

The pair of friction faces can in principle be conical or provided in the form of a radial pair of friction faces. The axial force acting on the pair of friction faces cause a friction moment so that a relative rotational movement of the roller carrier relative to the receiving housing is dampened. If the pair of friction forces comprises a conical friction face, it is proposed, more particularly, that a cone angle enclosed with the pivot axis is greater than an angle enclosed between the outer bearing face of the bearing bush and the pivot axis. The parameter, i.e., magnitude of the friction moment and thus the degree of damping of the tensioning device can be adjusted via the size of the cone angle. For example, the cone angle can range between 3° and 10°.

In a more concrete example, the damping arrangement can comprise a damping bush which is arranged between an inner conical face of the receiving housing and an outer annular face of the roller carrier. The damping bush can comprise an outer conical friction face which is in friction contact with the inner conical face of the receiving housing. Thereby with the conical friction face of the damping bush and the inner conical face of the receiving housing form a pair of friction faces of the damping arrangement. A second pair of friction faces can be provided between an outer annular face of the roller carrier and an inner face of the bearing bush, which correspond to one another and which, more particularly, can be cylindrical or conical. Due to the indirect friction face contact between the receiving housing and the roller carrier effected by the damping bush, the damping arrangement also has a radial and axial bearing function between the housing and the carrier, at the same time. In this context, the damping arrangement can also be referred to as a combined damping and bearing arrangement.

According to an example, the roller carrier can comprise a hub element and a ring element wherein the ring element surrounds the hub element radially outwardly, with the outer ring face serving to receive the damping bush, wherein between the hub element and the ring element an annular chamber is formed in which a portion of the helical spring is arranged. More particularly, it is proposed that the hub element and the ring element are produced so as to be integral with one another, for example as a casting, and in this context can also be referred to as the hub portion and the ring portion of the roller carrier. The outer ring face of the ring element can be cylindrical or conical.

According to an example, the helical spring comprises a first end portion which, in the threaded-in condition, is supported at the receiving housing in the circumferential direction and in the axial direction, as well as a second end portion which, in the threaded-in condition, is supported at the roller carrier in the opposite circumferential direction and in the opposite axial direction.

For axially and rotationally supporting the helical spring relative to the receiving housing, it is proposed that the receiving housing comprises a base with thread-like engagement means and a stop at the end of the thread-like engagement means. The thread-like engagement means are designed in such a way that the helical spring can be threaded into the thread-like engagement means until the stop is reached. In this way, an axial and circumferential connection is effected in a simple manner. In consequence, there is no need for separate fixing means.

The same applies to the second end of the helical spring. In a cover portion, the roller carrier can comprise thread-like engagement means and a stop at the end of the thread-like engagement means. After the helical spring has been inserted into, and made to engage the engagement elements of the receiving housing, the roller carrier can be placed on to the receiving housing. The second end portion of the helical spring can be made to engage the thread-like engagement means of the cover by effecting an inserting and rotational movement of the roller carrier relative to the receiving housing. By rotating the roller carrier relative to the helical spring, the second spring end, to an increasing extent, engages the thread-like engagement means, with the helical spring being axially pretensioned.

In the fully mounted condition, the roller carrier and the receiving housing are axially fixed and axially pretensioned relative to one another. The helical spring thus fulfils several functions, i.e., it resiliently supports the roller carrier relative to the housing in the rotational direction, it axially fixes the roller carrier to the housing and axially loads the pair of friction faces of the damping arrangement. There is no need for separate fixing means for connecting the carrier to the housing, so that the tensioning device comprises the smallest possible number of components and can be produced easily and cost-effectively. A further advantage is that with an increasing pivot movement of the roller carrier relative to the receiving houses, the tensile force acting from the helical spring on the roller carrier in the direction of the housing also intensifies. This means that the degree of damping of the tensioning device depends on the deflection of the roller carrier.

The thread-like engagement means at the receiving housing and at the roller carrier can be provided in the form of a thread-like channel which is formed by a plurality of circumferentially distributed webs.

DRAWINGS

DETAILED DESCRIPTION

Figure 1:
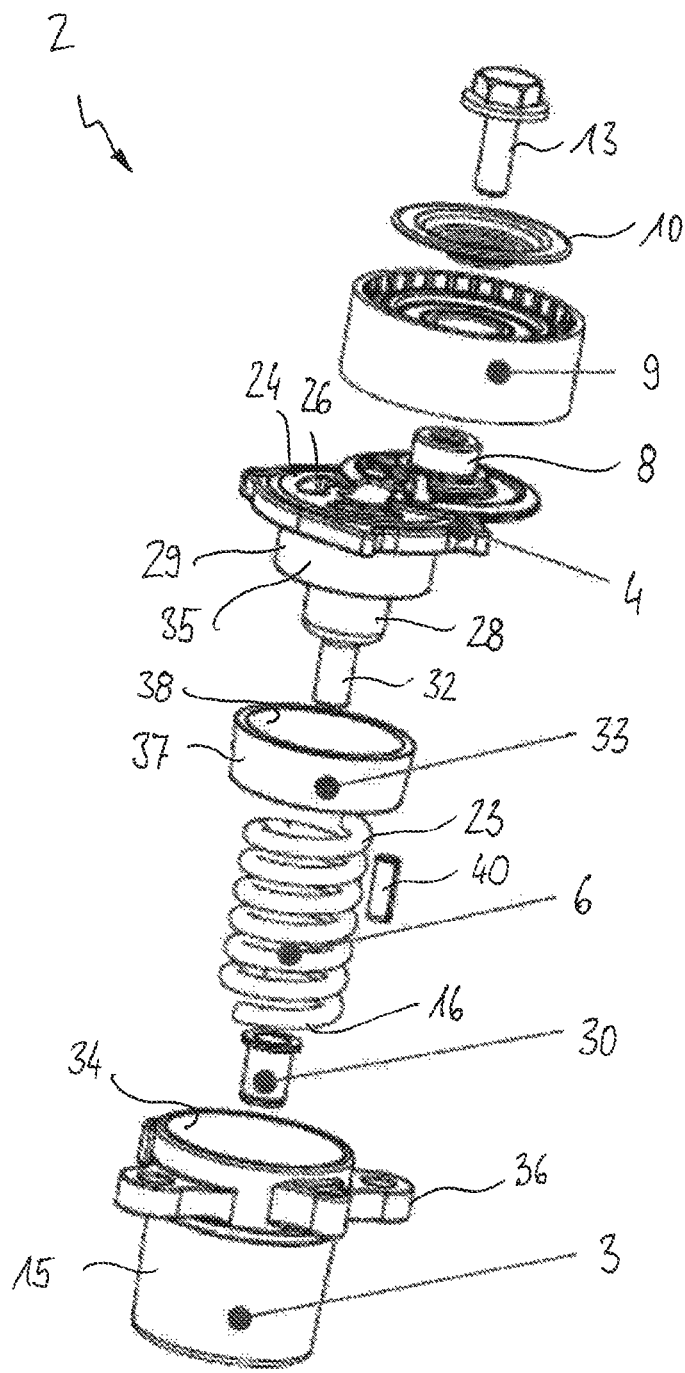
FIG. 1 shows a first example of a tensioning device in a perspective exploded view.
Figure 2:
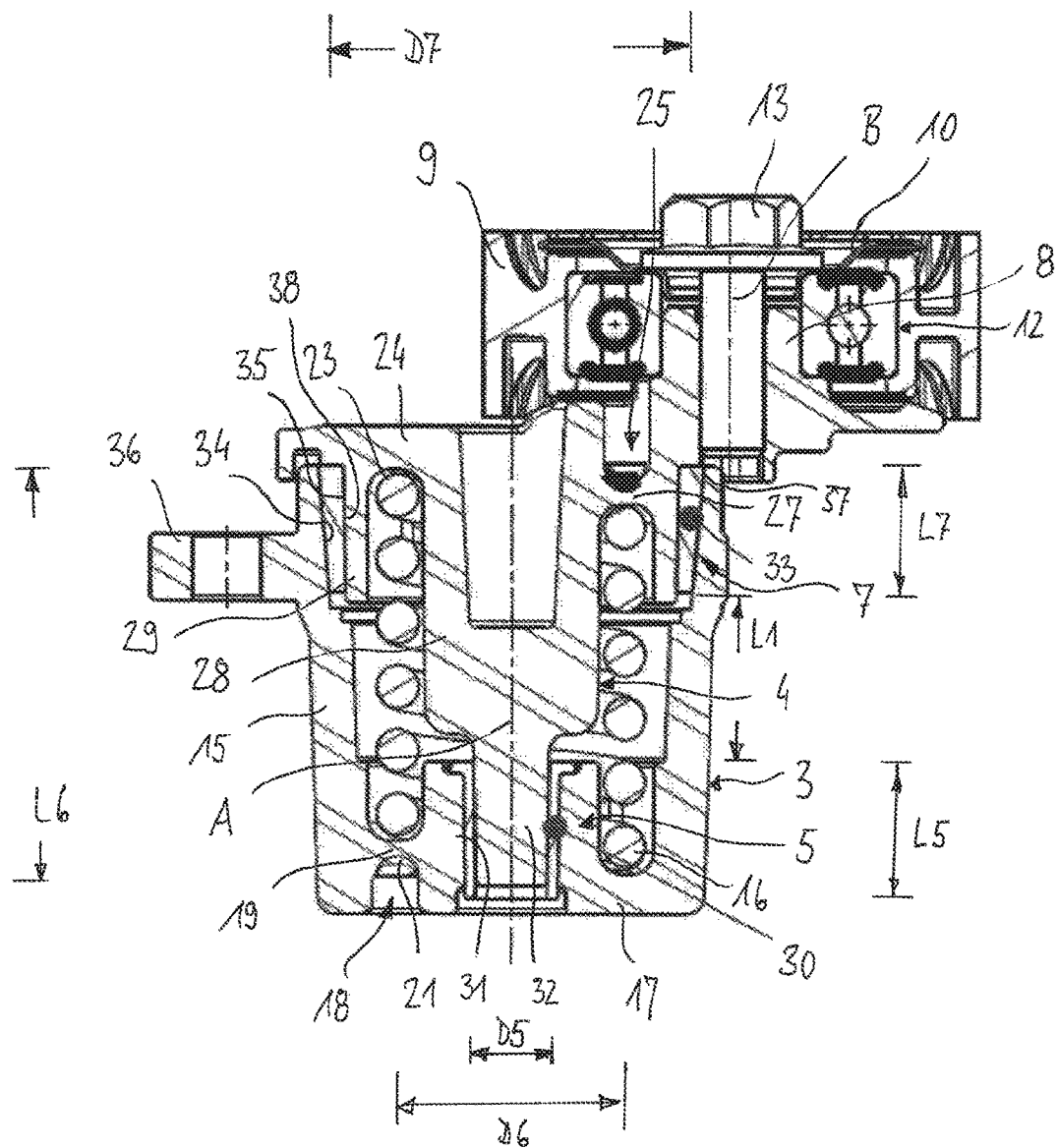
FIG. 2 shows the tensioning device according to FIG. 1 in a longitudinal section.

FIGS. 1 and 2, which will be described jointly below, show an inventive tensioning device 2. The tensioning device is designed for tensioning an endless belt of a belt drive (not illustrated) and can also be referred to as belt tensioning device. It is understood that the tensioning device 2 can also be configured to be used for tensioning a chain drive. The belt tensioning device 2 comprises a receiving housing 3, a roller carrier 4 which, relative to the receiving housing 3, can be dampingly supported around a pivot axis 4 by a bearing arrangement 5 and a damping arrangement 7, and which device 2 also comprises a helical spring 6 by which the roller carrier 4 is resiliently supported relative to the receiving housing 3, i.e., against the housing 3 in the axial direction and in the circumferential direction. The receiving housing can be fixed to a stationary component such as an aggregate or motor block (not illustrated) or to a component connected thereto. For connecting the receiving housing 3 it comprises a plurality of radially outwardly projecting fixing portions 36 with bores through which bolts or pins 40 respectively can be inserted for connecting the housing 3 to the stationary component. The roller carrier 4 and the receiving housing 3 can be produced in one piece, for example, as a casting, but it is also possible to use suitable plastics.

At a free end portion, the roller carrier 4 carries a tensioning roller 9 which is rotatable around a rotational axis B which extends parallel to the pivot axis A. The tensioning roller 9 is rotatably supported on a bearing journal 8 and connected thereto by a screw 13. A sealing ring 10 attached to the bearing journal 8 by the screw 13 and covering the bearing 12 protects the bearing 12 against penetrating dirt. Via the bearing arrangement 5 and the damping arrangement 7. The roller carrier 4 is axially and radially supported around the pivot axis A relative to the receiving housing 3 and is rotatable, wherein a relative rotational movement of the roller carrier 4 is dampened by friction moments generated in the damping arrangement 7. The damping arrangement 7 is arranged so as to be axially spaced from the bearing arrangement 5 and is axially loaded by a tensile prestress of the helical spring 6. The helical spring 6 is axially supported on the receiving housing 3 on the one hand and on the roller carrier 4 on the other hand in opposite axial directions. To that extent, the helical spring 6 can also be referred to as a helical tensile spring.

The helical spring 6 is arranged substantially coaxially relative to the pivot axis A in an annular chamber formed between the receiving housing 3 and the roller carrier 4. The number of windings of the helical spring 6 can be between four and eight for example and in the present embodiment amounts to approximately six, wherein it is understood that depending on size, spring wire diameter and application other winding numbers are also possible. In the mounted condition of the helical spring 6 in which the helical spring is axially prestressed in respect of tension, the ratio of the length L6 of the helical spring 6 to the nominal diameter D6 of the helical spring can range between 1.0 and 2.5, for example, more particularly 1.5 to 2.0. It is understood that said values are not meant to be limiting and that, inter alia, said ratio of length to spring diameter in the built-in condition also depends on the wire diameter of the spring wire. The greater the wire diameter, the smaller the axial length of the helical spring can be.

A first end portion 16 of the helical spring 6 at a base part 17 of the receiving housing 3 is supported in the circumferential direction and in the axial direction. The opposite second end portion 23 of the helical spring 6 is supported on a cover part 24 of the roller carrier 4 in the circumferential direction and in the axial direction. The helical spring 6 generates a tension of the roller carrier 4 relative to the receiving housing 3 so that the belt of the belt drive is pretensioned. At the same time, the roller carrier 4 is axially fixed to the receiving housing 3 by means of the helical spring 6.

For axially supporting the helical spring 6 relative to the receiving housing 3, the base part 17 of the receiving housing is provided with thread-like engagement means 18 which are configured such that the helical spring 6 can be threaded into same. The engagement means 18 comprise a plurality of webs 19 which are circumferentially distributed and axially offset relative to one another, with the first end portion 16 of the helical spring 6 engaging behind same during the threading-in process. The webs, together, form a thread-like channel whose gradient approximately corresponds to the gradient of the first end portion 16 of the helical spring 6. At the end of the thread-like channel, the base part 17 comprises a stop 20 against which the spring end abuts, so that the helical spring 6 at the receiving housing 3 is supported in a first rotational direction. By engaging, i.e., screwing, the end portion 16 into the channel formed by the webs 19, the helical spring is supported on the webs 19 in both axial directions, i.e., in respect of pressure and more particularly also in respect of tension.

Accordingly, the opposite second end portion 23 of the helical spring 6 is supported on the roller carrier 4 in the opposite second axial direction and in the opposite second rotational direction. For this purpose, the roller carrier 4, in the cover portion 24 thereof, comprises corresponding thread-like engagement means 25 and a stop 26 at the end of the thread-like engagement means 25. After the helical spring 6 has been inserted and threaded into the receiving housing 3, the roller carrier 4 is placed on to the receiving housing 3. By a subsequent rotational movement of the roller carrier 4 relative to the receiving housing 3 in the rotational direction in which the helical spring 6 is supported on the receiving housing 3, the second end portion 23 of the helical spring 6 is made to engage the thread-like engagement means 25 of the cover portion 24. Upon an increasing rotational movement of the roller carrier 4 relative to the helical spring 6, the second end portion 23 increasingly engages the thread-like engagement means 25, with the helical spring 6 being axially prestressed in respect of tension. The engagement means 25 of the cover part 24 are designed in accordance with the engagement means at the base part and comprise a plurality of circumferentially distributed webs 27 which are axially offset relative to one other, with the second portion 23 of the helical spring 6 engaging behind same during the threading-in process. The webs 27, altogether, form a thread-like channel whose gradient approximately corresponds to the gradient of the second end portion 16 of the helical spring 5.

In the fully mounted condition, the roller carrier 4 and the receiving housing 3 are axially fixed relative to one another and axially pretensioned. The helical spring 6 fulfils the functions of a resilient support of the roller carrier 4 against the housing 3 in the rotational direction, of axially fixing the roller carrier 4 at the housing 3 and of axially loading the damping arrangement 7. With an increasing pivot movement of the roller carrier 4 relative to the receiving housing 3, the helical spring 6 expands to an increasing extent, so that an increasing tensile force acts from the helical spring 6 on the roller carrier 4 and the housing 3, which tensile force loads said components towards one another. The damping effect of the tensioning device 2 thus increases with an increasing degree of deflection of the roller carrier 4.

More particularly, the receiving housing 3 is cup-shaped and comprises the base part 17 which can also be referred to as the base portion or simply as the base; the receiving housing 3 also comprises a casing part 15 or casing portion inside which there is formed a receiving chamber for the roller carrier 4 and the helical spring 6. At an upper region of the casing part 15, the fixing portions 36 are formed on so as to be integral therewith or cast on respectively. In the region of the base part 17 there is arranged the bearing arrangement 5 and in the upper region of the casing part there is arranged the damping arrangement 7 which will be referred to in greater detail below.

The roller carrier 4 comprises the cover part 24, furthermore a hub element 28 extending from the cover part 24 towards the base part 17, as well as a ring element 29 arranged coaxially relative to the hub element 28. The hub element 28 is rotatably supported in the base part 17 by the bearing arrangement 5. The ring element 29 forms part of the damping arrangement 7. Between the hub element 28 and the ring element 29 an annular chamber is formed in which an upper portion of the helical spring 6 is arranged.

The bearing assembly 5 comprises a bearing bush 30 which is arranged between a first bearing part 31 of the receiving housing 3, which bearing part is designed as a bearing sleeve, and a second bearing part 32 of the roller carrier 4, which second part is designed as a bearing bolt. The bearing bush 30, including the bearing parts 31, 32, are cylindrical or slightly conical; with a slightly conical shape the parts can be removed more easily during production. The bearing bolt 32 is integrally formed or cast on to the hub part 28 of the roller carrier 4. The bearing material for the bearing bush 30 can be suitable plastics or a steel bush coated with a low-friction material such as PTFE.

The damping arrangement 7 comprises a damping bush 33 which is arranged between an inner conical face 34 of the receiving housing 3 and an outer annular face 35 of the roller carrier 4. The damping bush 33 comprises an outer conical friction face 37 which is in friction contact with an inner conical face 34 of the receiving housing 3. The conical friction face 37 of the damping bush 33 and the inner conical face 34 of the receiving housing 3 form a first pair of friction faces of the damping arrangement 7. A second pair of friction faces is formed between the outer annular face 35 of the roller carrier 4 and an inner annular face 38 of the damping bush 33 which are both cylindrical. The damping bush 33 and thus the pairs of friction faces are axially loaded by the tensile force of the helical spring 6, as a result of which a friction moment is generated so that a relative rotation of the roller carrier 4 relative to the receiving housing 3 is dampened. At same time, the damping arrangement 7 also has a bearing function to ensure the axial and radial support of the roller carrier 4 in the receiving housing 3, so that these can also be referred to as a damping and bearing arrangement. The damping arrangement 7 is designed such that a greatest cone angle of at least one of the pairs of friction faces, which cone angle can also be referred to as damping angle, is greater than a greatest angle enclosed by the casing face of the bearing arrangement 5 and the pivot axis A.

In FIG. 2 it can be particularly seen that a support-free intermediate region is formed axially between the bearing arrangement 5 and the damping arrangement 7. The transverse forces introduced by the tensioning roller 9 into the roller carrier 4 are thus supported entirely by the bearing arrangement 5 and the damping arrangement 7 axially spaced from the bearing arrangement 5. The length L1 of the support-free intermediate region is greater than the axial length L5 of the bearing arrangement 5 and/or the length L7 of the damping arrangement 7, so that the transverse forces are supported particularly effectively. Furthermore, it is proposed that a medium bearing diameter D5 of the bearing assembly 5 is smaller than a medium diameter D7 of the damping assembly 7. Together with the axial distance between the bearing arrangement 5 and the damping assembly 7 there are thus achieved particularly effective bearing, centering and supporting conditions against tilting moments.

Figure 3:
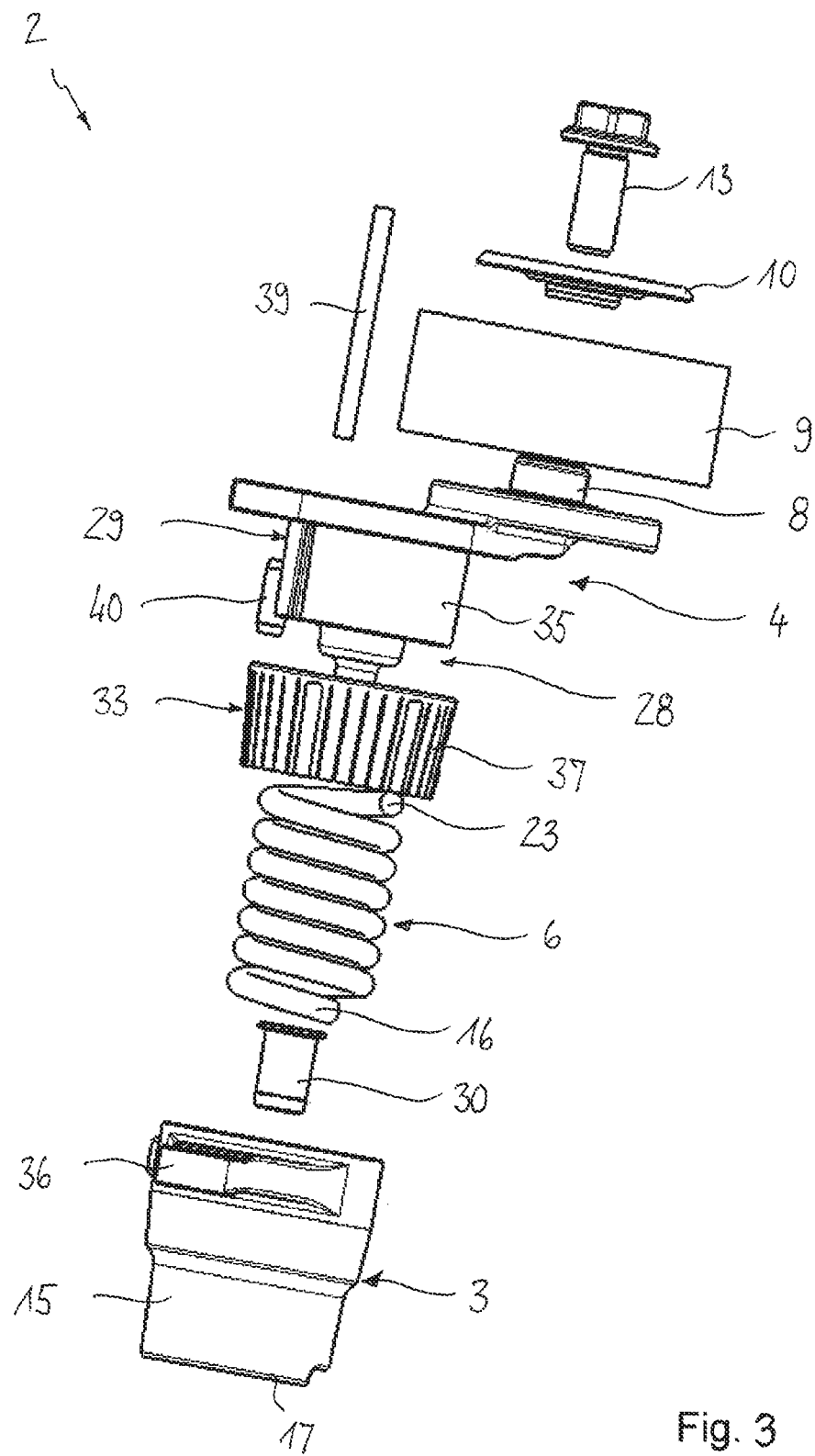
FIG. 3 shows the a slightly modified second example tensioning device in an exploded view in a side view.
Figure 5:
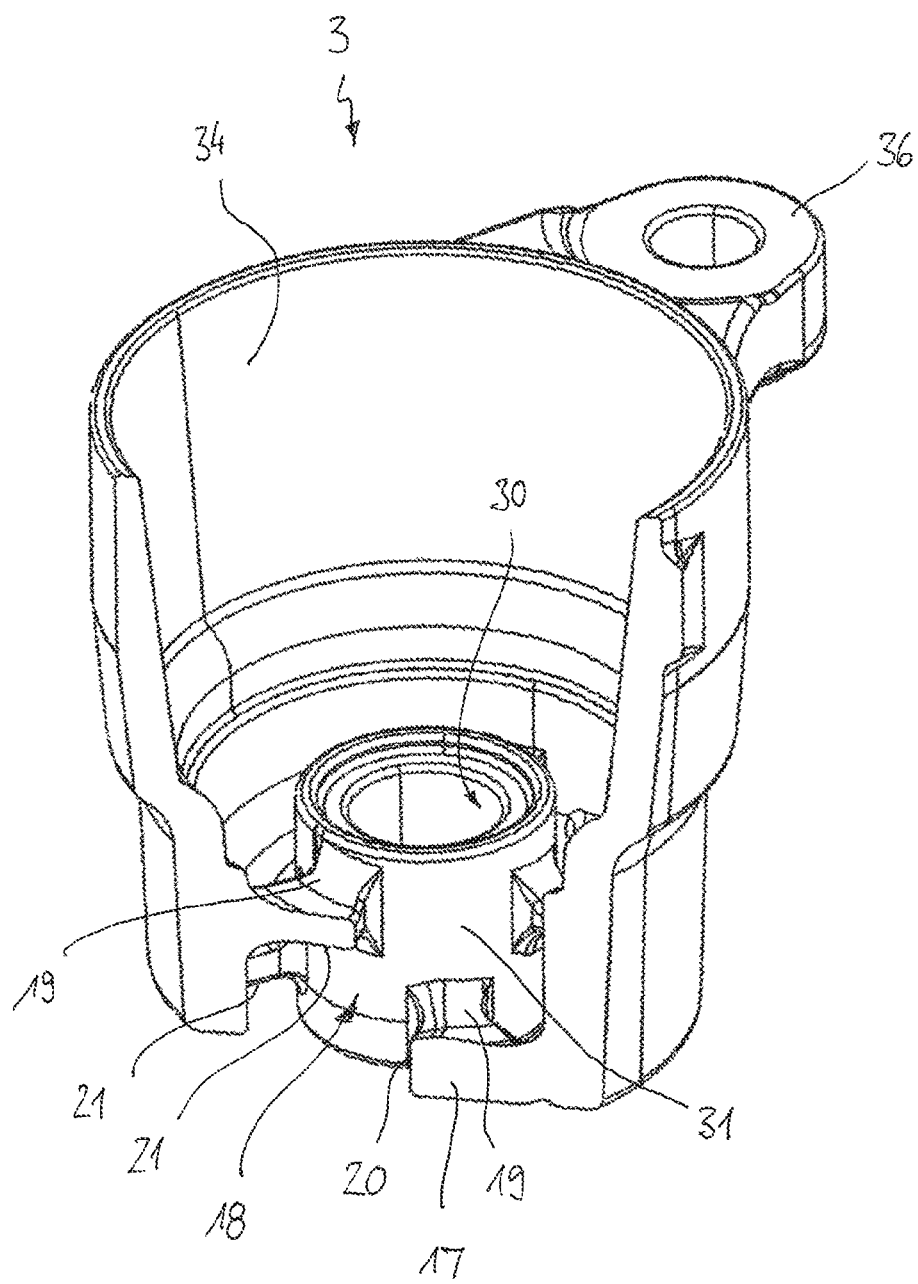
FIG. 5 shows the receiving housing of the tensioning device according to FIGS. 3 and 4 in a perspective view, partially in section.

FIGS. 3 and 5, which will be described jointly below show an example tensioning device 2 in a slightly modified arrangement. As far as structure and operation mode are concerned, the second example largely corresponds to that shown in FIGS. 1 and 2, so that as far as common features are concerned, reference is made to the above description. Thereby, identical components or components corresponding to one another, have the same reference numbers as in FIGS. 1 and 2.

Figure 4:
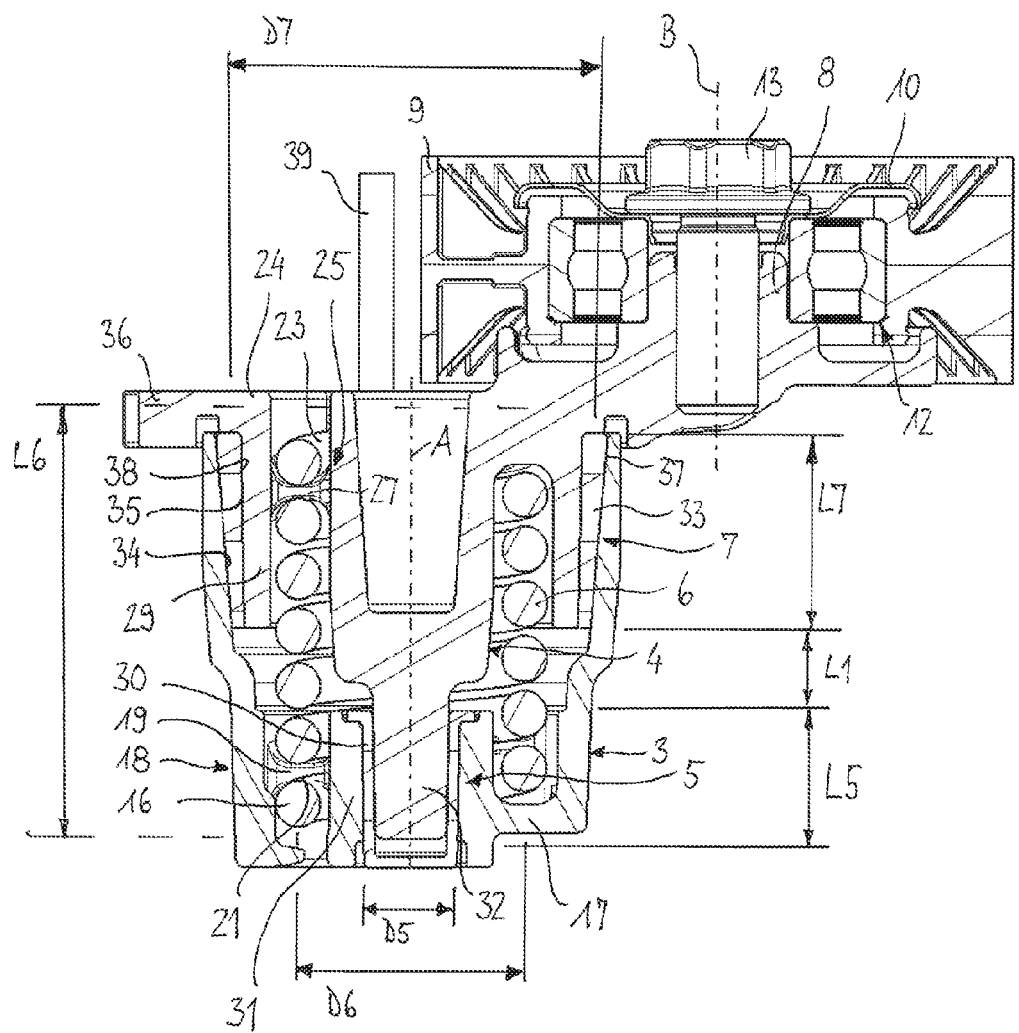
FIG. 4 shows the tensioning device according to FIG. 3 in a longitudinal section.

A difference is that in the case of the embodiment according to FIGS. 3 to 5, the length L1 of the support-free region is smaller than the axial length L5 of the bearing assembly 5 and the length L7 of the damping arrangement 7. The design of the tensioning device according to FIGS. 3 to 5 is somewhat more compact in the axial direction, which, accordingly, also applies to the installation space required. Also the shape of the housing is somewhat more compact. It can be seen in FIG. 3 that the damping bush 33 comprises a structured conical friction face 37 which can also apply to the embodiment according to FIGS. 1 and 2. Otherwise, all the details of FIGS. 1 and 2 also apply to the modified second embodiment. In FIGS. 3 and 4 one can see a securing pin 39 which holds the roller carrier 4 in a pretensioned position; after assembly of the tensioning device at the belt drive, the pin 39 is pulled so that the belt is pretensioned. In FIG. 5 which shows the housing partially in section, the lower engagement means 18 with their circumferentially distributed webs 19 can be seen; they are to be engaged from behind by the lower winding portion of the spring 6, so that the spring 6 is prestressed in respect of tension. Said described design of the engagement means 18 and of the securing pin 39 also applies to the embodiment according to FIGS. 1 and 2.

In an advantageous way, the presently disclosed tensioning devices can be produced easily and cost-effectively. Because the helical spring 6 is mounted in respect of tension between the receiving housing 3 and the roller carrier 4, the spring also assumes an axial connection function in addition to providing a resilient support of said parts in the rotational direction. By using a substantially cylindrical bearing arrangement 5 and a conical damping arrangement 7, there is provided effective support against tilting moments and any susceptibility to an undesired tilt is prevented. A further advantage is that the helical spring 6, while being expanded radially, is increasingly loaded in respect of tension, which leads to an increasing axial force acting on the damping arrangement 7 and thus to an increasing damping effect.

The invention claimed is:

1. A tensioning device for a traction drive comprising:
   a receiving housing;
   a roller carrier pivotably connected to the receiving housing;
   a helical tension spring supported at the receiving housing and at the roller carrier in each of a circumferential and an axial direction, wherein the roller carrier and the receiving housing are axially connected to one another by the helical tension spring;
   a bearing arrangement by which the roller carrier is supported in the receiving housing so as to be rotatable around a rotational axis; and
   a damping arrangement for damping a rotational movement of the roller carrier relative to the receiving housing, wherein the damping arrangement is arranged so as to be axially spaced relative to the bearing arrangement and wherein the damping arrangement is axially loaded by a tensional load of the helical tension spring,
   wherein a support-free intermediate space is formed axially between the bearing arrangement and the damping arrangement.

2. A tensioning device according to claim 1, wherein the bearing arrangement comprises a medium bearing diameter which is smaller than a medium diameter of the damping arrangement.

3. A tensioning device according to claim 1, wherein an axial length of the support-free intermediate space is greater than at least one of an axial length of the bearing arrangement and of an axial length of the damping arrangement.

4. A tensioning device according to claim 1, wherein the bearing arrangement comprises a bearing bush which is arranged between a bearing part of the receiving housing and a bearing part of the roller carrier, wherein the bearing bush is substantially cylindrical.

5. A tensioning device according to claim 4, wherein the bearing part of the receiving housing is a bearing sleeve and the bearing part of the roller carrier is a bearing bolt which is inserted into the bearing sleeve.

6. A tensioning device according to claim 1, wherein the damping arrangement comprises a least one pair of friction faces which are axially loaded by a tensile force of the helical tension spring, whereby a relative rotational movement of the roller carrier relative to the receiving housing is dampened.

7. A tensioning device according to claim 1, wherein the damping arrangement comprises a damping bush which is arranged between an inner conical face of the receiving housing and an outer annular face of the roller carrier, wherein the damping bush comprises an outer conical friction face which is in friction contact with an inner conical face of the receiving housing.

8. A tensioning device according to claim 4, wherein the conical friction face of the damping bush is more inclined relative to the rotational axis than an outer bearing face of the bearing bush.

9. A tensioning device according to claim 4, wherein the bearing bush and the damping bush are made of different materials from one another.

10. A tensioning device according to claim 7,
    wherein the roller carrier comprises a hub element and a ring element, wherein the ring element surrounds the hub element radially outside and forms the outer ring face for receiving the damping bush,
    wherein an annular chamber is formed between the hub element and the ring element in which annular chamber a portion of the helical spring is arranged.

11. A tensioning device according to claim 10, wherein the outer ring face of the ring element is cylindrical.

12. A tensioning device according to claim 1, wherein the helical spring comprises a first end portion which, in a mounted condition, is circumferentially and axially supported at the receiving housing, as well as a second end portion which, in the mounted condition, is circumferentially and axially supported at the roller carrier.

13. A tensioning device according to claim 1, wherein the receiving housing comprises a base with thread-like engagement elements and a stop at the end of the thread-like engagement elements, wherein, for mounting, the helical spring is threaded into the thread-like engagement elements up to reaching the stop.

14. A tensioning device according to claim 1, wherein the roller carrier comprises a cover with thread-like engagement elements and with a stop at the end of the thread-like engagement elements, wherein the second end portion of the helical spring can be made to engage the thread-like engagement elements of the cover by an inserting and rotational movement of the roller carrier relative to the receiving housing.

15. A tensioning device for a traction drive comprising:
    a receiving housing;
    a roller carrier pivotably connected to the receiving housing;
    a helical tension spring supported at the receiving housing and at the roller carrier in each of a circumferential and an axial direction, wherein the roller carrier and the receiving housing are axially connected to one another by the helical tension spring;

a bearing arrangement by which the roller carrier is supported in the receiving housing so as to be rotatable around a rotational axis; and a damping arrangement for damping a rotational movement of the roller carrier relative to the receiving housing, wherein the damping arrangement is arranged so as to be axially spaced relative to the bearing arrangement and wherein the damping arrangement is axially loaded by a tensional load of the helical tension spring, wherein the bearing arrangement comprises a bearing bush which is arranged between a bearing part of the receiving housing and a bearing part of the roller carrier, wherein the bearing bush is substantially cylindrical, wherein the damping arrangement comprises a damping bush which is arranged between an inner conical face of the receiving housing and an outer annular face of the roller carrier, wherein the damping bush comprises an outer conical friction face which is in friction contact with an inner conical face of the receiving housing, and wherein the conical friction face of the damping bush is more inclined relative to the rotational axis than an outer bearing face of the bearing bush.

16. A tensioning device for a traction drive comprising:

a receiving housing;

a roller carrier pivotably connected to the receiving housing;

a helical tension spring supported at the receiving housing and at the roller carrier in each of a circumferential and an axial direction, wherein the roller carrier and the receiving housing are axially connected to one another by the helical tension spring;

a bearing arrangement by which the roller carrier is supported in the receiving housing so as to be rotatable around a rotational axis; and a damping arrangement for damping a rotational movement of the roller carrier relative to the receiving housing, wherein the damping arrangement is arranged so as to be axially spaced relative to the bearing arrangement and wherein the damping arrangement is axially loaded by a tensional load of the helical tension spring, wherein the bearing arrangement comprises a bearing bush which is arranged between a bearing part of the receiving housing and a bearing part of the roller carrier, wherein the bearing bush and the damping bush are made of different materials from one another.

* * * * *